United States Patent [19]
Herron

[11] Patent Number: 6,042,383
[45] Date of Patent: Mar. 28, 2000

[54] PORTABLE ELECTRONIC DEVICE FOR ASSISTING PERSONS WITH LEARNING DISABILITIES AND ATTENTION DEFICIT DISORDERS

[76] Inventor: Lois J. Herron, 15905 Bent Tree Forest Cir. #2032, Dallas, Tex. 75248

[21] Appl. No.: 09/085,327

[22] Filed: May 26, 1998

[51] Int. Cl.[7] .......................... G09B 19/00; G09B 19/18; G09B 21/00; G09B 5/00
[52] U.S. Cl. .......................... 434/238; 434/107; 434/112; 434/118; 434/307 R
[58] Field of Search .................... 434/107, 108, 434/112, 118, 236, 237, 238, 262, 307 R

[56] References Cited

U.S. PATENT DOCUMENTS

| | | | |
|---|---|---|---|
| 5,288,233 | 2/1994 | Green | 434/238 |
| 5,619,477 | 4/1997 | Schenk | 368/10 |
| 5,673,691 | 10/1997 | Abrams et al. | 128/630 |
| 5,722,418 | 3/1998 | Bro | 128/732 |
| 5,797,089 | 8/1998 | Nguyen | 455/403 |
| 5,856,931 | 1/1999 | McCasland | 364/550 |
| 5,873,731 | 2/1999 | Prendergast | 434/262 |
| 5,890,905 | 4/1999 | Bergman | 434/118 |
| 5,908,301 | 6/1999 | Lutz | 434/236 |

*Primary Examiner*—Robert A. Hafer
*Assistant Examiner*—John Edmund Rovnak
*Attorney, Agent, or Firm*—David H. Judson; Douglas A. Sorensin; Hughes and Lace, L.L.P.

[57] ABSTRACT

A portable electronic device assists persons with learning disabilities and attention deficit disorders in performing daily living tasks. These tasks can include, e.g., making a bed, applying makeup, brushing teeth, getting dressed, and eating a meal, or hundreds of other tasks. The device is designed to allow users to develop a personal schedule of these tasks and special events. It alerts users at predetermined times to perform scheduled tasks and coaches and motivates the user in completing the tasks through text, audio and animation. The user is given a predetermined period of time to complete the task and rewarded with points if the task is completed on time. The device also records the user's performance of tasks and creates a task log of the user's performance over a given period of time.

32 Claims, 2 Drawing Sheets

PORTABLE ELECTRONIC DEVICE FOR ASSISTING PERSONS WITH LEARNING DISABILITIES AND ATTENTION DEFICIT DISORDERS

BACKGROUND OF THE INVENTION

1. Technical Field

The present invention relates generally to devices for assisting persons with learning disabilities and attention deficit disorders. More specifically, it relates to a portable electronic device for assisting such persons to more independently manage their lives.

2. Description of the Related Art

Persons suffering from disorders such as learning disabilities (LD), attention deficit disorders (ADD) or attention deficit hyperactive disorders (ADHD) generally experience difficulty in independently performing routine daily tasks such as making a bed, applying makeup, brushing teeth, getting dressed, and eating a meal. Sufferers of these disorders often fail to remember sequencing of activities, to be on time, and to keep up. They are frequently easily distracted and fail to complete tasks, often switching from one task to another without completing any of them. As a result, persons with these disorders, particularly children, are often criticized and ridiculed by others, causing low self-esteem.

Several devices have been proposed to assist persons with LD, AD, and ADHD perform routine tasks. For instance, U.S. Pat. No. 5,288,233 issued to Green discloses a wall mounted cabinet that dispenses chips to reward children for performing specified tasks. However, these devices are of limited use since they lack features to properly coach users through tasks. The devices are also cumbersome and are not portable, making them impractical for general use.

Thus, a need exists for an easy-to-use portable device to guide and motivate persons suffering LD, ADD, and ADHD disorders in performing routine daily tasks.

BRIEF SUMMARY OF THE INVENTION

A primary object of the invention is to provide an easy-to-use, portable device to assist persons suffering LD, ADD, and ADHD disorders in performing routine daily tasks.

Another object of the invention is to provide a device that can be easily programmed to create a personal schedule of tasks for a user.

A further object of the invention is to provide a device that motivates users in completing tasks within predetermined time periods.

These and other objects are accomplished by a portable electronic device that assists persons with learning disabilities and attention deficit disorders in performing daily tasks. The device is designed to allow users to develop a personal schedule of tasks and special events. It alerts users at predetermined times to perform scheduled tasks and coaches users in completing the tasks. The user is given a predetermined period of time to complete the task and rewarded with points if the task is completed on time. The device also records the user's performance of tasks and creates a task log of the user's performance over a given period of time.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

Figure 1:
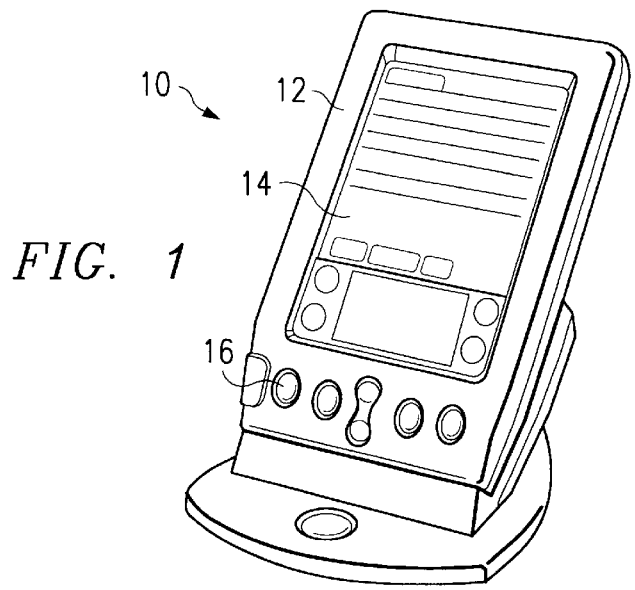
FIG. 1 is a perspective view of a portable electronic device in accordance with the invention.

A portable electronic device in accordance with the present invention is shown in FIG. 1. The device 10 preferably comprises one of a number of commercially available hand-held personal digital assistants (PDAs) also known as palmtop electronic organizers implementing software in accordance with the invention. The device 10 includes an outer housing 12 sufficiently small to be easily portable, a display 14, and control buttons 16 for operating the device 10.

Figure 2:
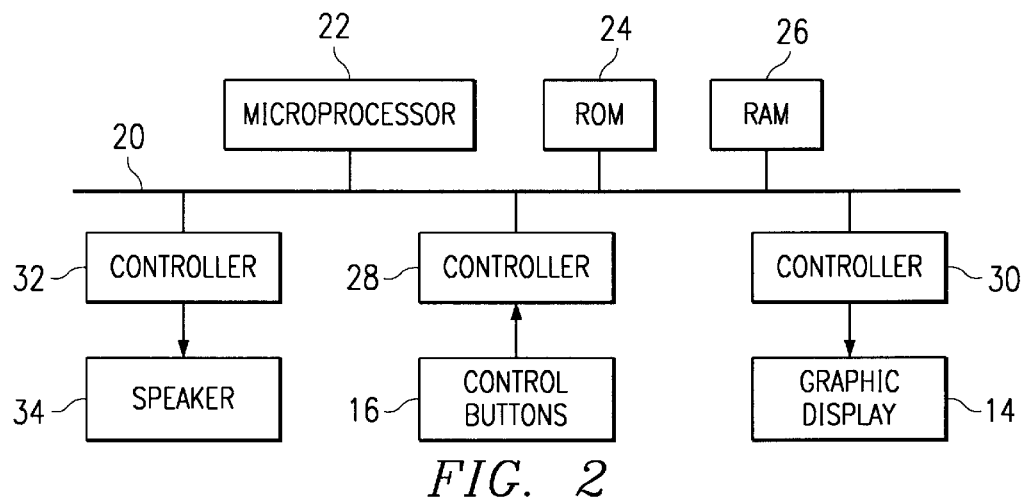
FIG. 2 is a block diagram of various components of the device.

FIG. 2 is a block diagram of various components of the device 10. The device 10 includes a system bus or plurality of system buses 20 to which various components are coupled and by which communication between the various components is accomplished. A processor 22 is connected to the system bus 20 and is supported by a read only memory (ROM) 24 and a random access memory (RAM) 26.

The ROM 24 contains among other code the code controlling basic hardware operations. The RAM 26 is the main memory into which the operating system and application programs are loaded.

Also connected to this system bus 20 are various I/O controllers, including a controller 28 providing the hardware interface for the control buttons 16, and a controller 30 providing the hardware interface for the display 14. A controller 32 provides the hardware interface for a speaker 34.

One of the preferred implementations of the invention is as a set of instructions in a code module resident in the RAM 26 of the device. However, until required by the device 10, the set of instructions may be stored in some other computer memory such as a hard disk drive of a personal computer (PC) or even downloaded via the Internet.

It has been found that the Palm III™ PDA sold by 3COM Corporation is particularly suitable for implementing the features of the invention. The Palm III™ is battery powered and is sufficiently small and lightweight (4.7 inches tall and 6 oz. in weight) to be carried in shirt pockets and purses. It is also sufficiently powerful to carryout the remote computing and communications features of the present invention.

Figure 3:
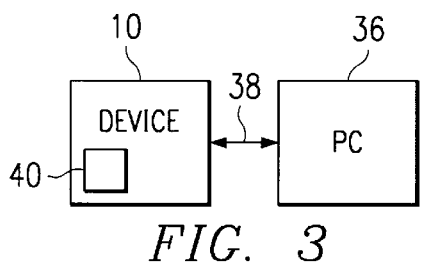
FIG. 3 is a block diagram showing an infrared communications link between the device and a personal computer.

As shown in FIG. 3, the device 10 can preferably communicate with a PC 36 through an infrared communications link 38 to exchange and update information both ways. This feature makes it particularly easy to update and change personal schedules as needed.

The device 10 preferably also includes an integrated pager card 40 to provide paging functions for remote connectivity. For instance, the device 10 can be equipped with a Motorola PageCard™. The paging feature allows a person (such as a parent or other responsible person) remote from the user to insert tasks, notes and other information into the user's schedule stored in the device 10 using standard telephony technology. When a new message is received, the pager card 40 automatically turns the device 10 on and audibly alerts the user (if the audible alert feature in the device is turned on). A variety of audible alerts are available for user selection. The alert can be immediately silenced by the user by touching any control button 16 on the device 10. The person sending the page can send word messages to the device user or can update the user's schedule. Word messages can be read, discarded, or stored in the device 10 for viewing at another time by the user.

Figure 4:
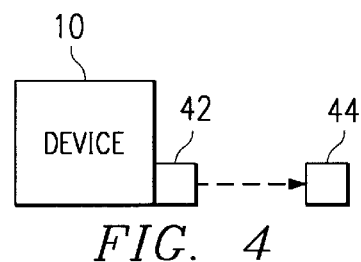
FIG. 4 is a block diagram showing the proximity alarm of the device.
Figure 5:
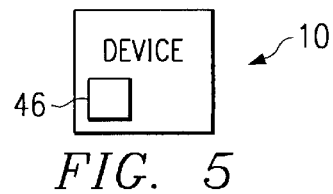
FIG. 5 is a block diagram showing the modem of the device.

The device 10 is also preferably includes a proximity alarm designed to keep the device from being misplaced or stolen. As shown in FIG. 4, the device 10 is equipped with a sending unit 42. A receiving unit 44 is kept separately by the user. If the two units 42, 44 are separated by distance greater than a preset distance (e.g., 15 feet), an alarm is triggered to audibly alert the user. This feature is particularly desirable for users with LD, ADD and ADHD who may be prone to misplacing their possessions.

The device is also preferably equipped to utilize an external Global Positioning System (GPS) to provide navigational assistance to users. Commercially available satellite navigation technology, e.g., DeLorme Tripmate™ provide an easy-to-use link to GPS. By integrating this technology in the device, the user can download a door-to-door route from any two locations in the U.S. The device will constantly update the user's current position and provide updated directions. This feature allows point to point navigational instructions to be provided to the users.

The device 10 also preferably includes a wireless modem 46 to facilitate remote monitoring of task completion and other features. A variety of modems may be used including, e.g., the Minstrel™ modem sold by Novatel Wireless, Inc. The modem 46 provides portable real-time access to e-mail, intranets and the Internet. Preferably, no plugging in or dialing up in needed. The modem 46 also preferably uses wireless IP technology, which is also known as Cellular Digital Packet Data (CDPD). CDPD is a method of transmitting data in small packets of information over existing cellular phone networks. CDPD is a fully digital network overlay, providing all the benefits of digital service, including lower error rates and lower costs.

If desired, a plurality of devices 10 can be remotely linked to provide assisted living services to a group of users. Linking can be established preferably using SyncServer™ technology in conjunction with an existing computer network. SyncServer™ supports two connection methods: (1) direct dial-in using a modem pool and (2) Network HotSync® technology connecting over various networks, including the Internet or an intranet.

The device 10 preferably includes the following software components: a Navigation Manager, a Daily Journal, a Task Manager, a Schedule Manager, and a Reporting Engine.

The Navigation Manager allows a user to maintain a set of pre-written point to point navigational route instructions. These instructions can later be used in the Task Manager to provide navigational instructions for a specific task through a lock-up feature.

The Daily Journal allows a user to record thoughts and feelings in the device to, e.g., enhance the effectiveness of any counseling or therapy he or she may be receiving. The user can be prompted to enter information into the journal by an event defined in the Schedule Manager.

The Daily Journal is particularly useful for users undergoing counseling. The user can record daily thoughts on the device 10 such as thoughts on trouble or problem areas he or she is experiencing. The user's notes can then be sent to the user's counselor at some time before the next counseling session, e.g., the night before the counseling session. The notes can be sent to the counselor directly using the modem 46. Alternatively, the user can download his or her notes using the infrared link 38 to a PC, and then transmit the notes to the counselor by email or some other means. After receiving the notes, the counselor will be able to identify problem areas to discuss and will not have to spend significant time during the counseling session trying to identify the problem areas. Users with LD, AD and ADHD often have difficulty during counseling sessions remembering the problem areas experienced.

The Task Manager prompts the user to provide actual task start and stop times for each scheduled task and provides the user with instructions facilitating task completions. By asking the user to provide a start time, the user will be reminded to start the task. The Task Manager can be configured to periodically alert the user that task execution should be in progress, calculate the time remaining and remind the user of the scheduled completion time. In addition, the Task Manager is able to access the information stored into Navigation Manager to provide navigational instructions for some tasks as required. In addition, the Task Manager uses graphics and animation for tasks.

The Task Manager allows the user to select from a variety of alert strategies. The user will be able to associate up to three types of alerts with each task (Task Begin, Task Continue, and Task End). Each alert will have an audible and a visual component. The user can select from a list of icons for the visual component and a list of audio sequences for the audible component.

The Schedule Manager allows the user to define task templates that can be applied to a given date or range of dates. The user can add, delete or modify task templates.

The Schedule Manager allows the user to define each task that will make up the task template. The user can provide all of the information required by both a date book application stored in the device and the Task Manager. If the Task Manager is not utilized, the task attributes specific to the Task Manager application will be ignored.

The Repeat Window feature allows the user to schedule a task template for insertion into the date book. Instead of using multiple windows with different sets of controls for each kind of repeat period, the Schedule Manager will use a single unified window with enough power and flexibility to allow stetting almost any kind of repeating schedule.

The basic idea of Schedule Manager's scheduling system is for the user to describe what qualifications any given date has to meet to cause a task template to be applied on that day. All of the various qualifications are cumulative; all criteria must be met for a day to qualify. If a particular kind of requirement is irrelevant to the current task template, the user simply selects or includes all its possible values to remove it from consideration.

Data can be entered in various specified fields. The 'Repeat Every 'N' Matches' field lets the user skip otherwise qualified days to allow a task template to be inserted every other, every fourth, etc., matching day.

The 'From' and 'To' fields set the overall time span for the task template. The task template will be inserted for the first time on the first matching date on or after the From date, and will be inserted again every 'N' matching days after that as specified in the Every field. Setting the correct From date is especially important when skipping matches; the user should select the first date that the task template should be inserted, so that it starts out properly synchronized. If a To date is specified, the task template will be automatically deleted from the Schedule Manager database after being inserted for the last time on or before that date, i.e., wherever the next matching date would be after the To date.

The 'Dates Are' field lets a user select certain dates of the month as valid. The user enters the valid dates in text form. A list of dates can be entered, specified singly (e.g., 5) and/or in hyphen-separated ranges (e.g., 1–10). Multiple dates or ranges can be separated by blanks or any other non-hyphen punctuation. For example, '1–31' allows any date; '10 12' allows only the 10th and 12th of each month; and '2–6,12, 14' allows the 2nd thorough the 8th, plus the 12th and 14th. The date '31' is special; the last day of any month is considered when 31 is provided as a valid date.

The 'Weeks Are' field selects which of the 5 possible occurrences of a particular day of the week in each month to consider valid, and works in conjunction with the 'Date Are' field below it. This is used to select combinations like the first Sunday, fourth Friday, or last Monday of the month. The 'L' button selects the Last such day in the month, where it is the fourth or fifth one.

The 'Days Are' and 'Months Are' fields restrict the task templates to certain days of the week or months of the year. The user should specify which days and months are valid.

The see how the current settings would actually work if used, the user presses a results button. Schedule Manager will display a list showing the date(s) when the current task template would be applied to the Date Book database. This provides an easy way to verify that the current settings are correct.

After providing all the repeat criteria for the template, the user will press an 'OK' button at the bottom. If contradictory requirements that cannot be matched (e.g., Every February 30th) have been entered, the user will be notified with an error alert, which will stay in the Repeat window until the error has been corrected. Each requirement type must have at least one valid selection chosen, or it will not be possible for any date to satisfy it. If the scheduling criteria entered are OK, the main display will be shown, and the date column for the task template will show the updated next date on which the task template will be applied.

The Reporting Engine facilitates the development and production of reports. The Reporting Engine includes a number of pre-built reports that provide for basic reporting needs and allow the user to develop custom reports to meet any more specific reporting requirements.

The device 10 is designed to allow users to develop a personal schedule of routine daily living tasks and special events. It is programmed to alert a user at predetermined times to perform certain daily tasks and to coach or guide the user through those tasks. These tasks can include, e.g., making a bed, applying makeup, brushing teeth, getting dressed, and eating a meal, and hundreds of additional tasks. The user is given a predetermined period of time to complete the task and rewarded with a given number of points if the task is completed on time, or fewer points if 'Continue' is pressed for additional time. The device 10 also records the user's performance of the assigned tasks and creates a task log of the user's performance over a given period of time.

Figure 6:
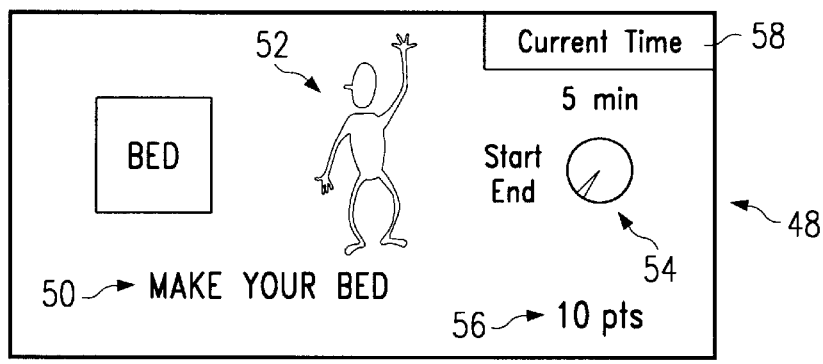
FIG. 6 is a view of a representative display screen for performing a given task.

For instance, in the morning at a pre-determined wake-up time, the device 10 sounds an alarm urging the user to wake up. Thereafter, the user is urged by a voice message to make his or her bed. This is also indicated on the display 14 as shown in the example screen 48 of FIG. 6. The display 14 shows a text message 50 instructing the user to make his or her bed. It also shows animation of a character 52 making a bed. In addition, the display shows a pie-chart timer 54 indicating the pre-set time for completing the task and the amount of that time that has elapsed. The screen 50 also shows the number of points 56 the user will receive if the task is completed on time. It can also be modified to show the number of points the user will receive if the task is completed using additional time. The current time 58 is also shown on the screen 48.

The animation continues while the pie-chart timer 54 is running so that the user is continually reminded of the task at hand. Thus, in the event the user is momentarily distracted, he or she will be quickly reminded of the current task to be completed.

The user is also notified by a voice message from the speaker 34 when half of the given time period on the pie-chart timer 54 has expired to help him or her keep pace.

Figure 7:
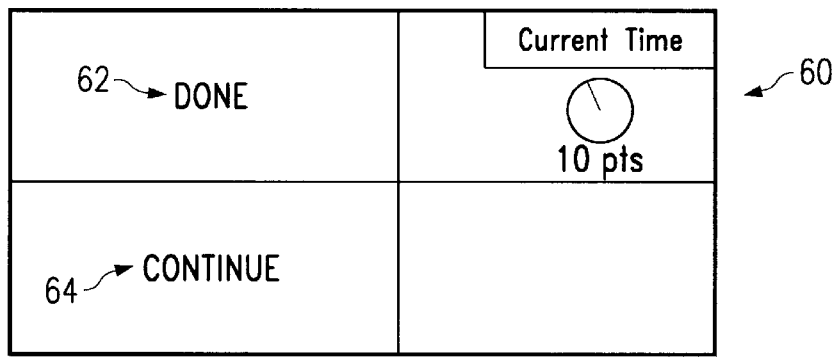
FIG. 7 is a view of a subsequent display screen for the task.

After the given time period on the pie-chart timer 54 has expired, a new screen 60 such as the one shown in FIG. 7 appears, and a voice message indicates that time has expired. At this time, the user is asked to press the screen at the word "DONE" 62 to indicate that the task has been competed or the word "CONTINUE" 64 to indicate that further time is required to finish the task. If the task is completed on time, the user is awarded the total possible points 56 assigned for that task as shown in the FIG. 6 screen.

If the user presses "CONTINUE", the pie-chart timer 54 is reset at one half of the given original pre-set time. If the user completes the task in the new time period, he or she is rewarded with a reduced number of points than if the task had been completed in the original given time period. The user is thereby motivated to complete the task in the original time period.

Figure 8:
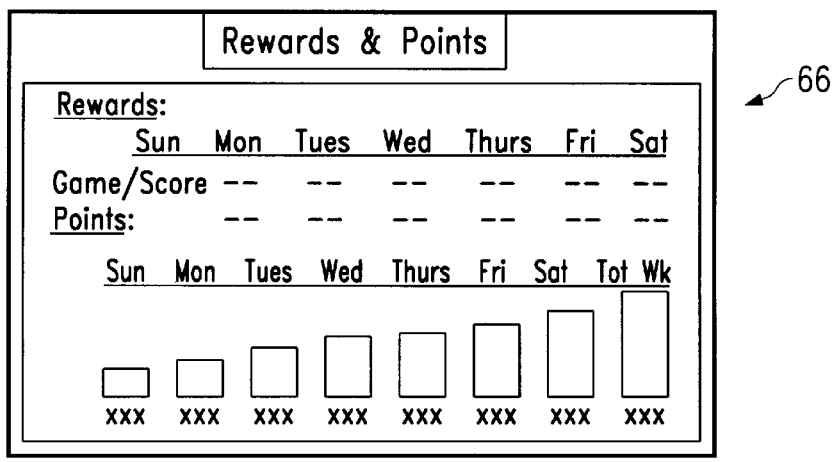
FIG. 8 is a view of a representative screen showing points accumulated by a user over a week.

In a similar manner, the user is alerted to perform other tasks. At the end of a day or week, the user can view a screen showing the total number of points earned. For example, the screen 66 shown in FIG. 8, shows a summary of points earned through a week. The screen 66 can be printed in a certificate format suitable for framing or collecting in a scrap book.

A parent or other person responsible for the user can decide what appropriate reward to give to the user based on the number of points accumulated in a given time period. The parent and user can discuss and mutually agree on what rewards would be appropriate for given number of points received. One possible reward would allow the child to play certain computer games on the device accessible by entry of an access code entered by the parent.

As previously mentioned, the device preferably includes pager functions, allowing unscheduled activities or tasks to be remotely programmed into the device. Also, messages can be sent to the user, e.g., to indicate a change in plans or to arrange a meeting place or to provide positive and congratulatory messages.

The present invention provides numerous advantages to users having LD, ADD, or ADHD. The invention allows the users to have greater independence in managing their activities. It guides and motivates users to complete tasks fully and quickly. It gives users a feeling of pride and dignity in being able to accomplish tasks independently, thereby building self-esteem. It gives children greater structure in their lives. It creates a positive, proactive environment, reducing the need for adults to continually remind or nag children about doing their tasks.

Having thus described my invention, what I claim as new and desire to secure by Letters Patent is set forth in the following claims:

1. A portable electronic device for assisting persons with learning disabilities or attention deficit disorders in performing given tasks, comprising:
   at least one processor;
   memory associated with the at least one processor;
   a display; and
   a program supported in the memory, the program comprising:
   (a) means for enabling a user to create a schedule of tasks to be performed at predetermined times, and completed during predetermined intervals;
   (b) means for alerting a user at said predetermined times to perform respective tasks;
   (c) means for displaying the portion of the predetermined intervals remaining after the respective predetermined times to perform respective tasks has occurred;
   (d) means, responsive to the completion of the respective predetermined interval, for determining, with user input, if the task was completed prior to the completion of the respective predetermined interval, wherein, if the task was not completed in the respective predetermined interval, a second predetermined interval is assigned, initiated and the portion of the second predetermined interval is displayed using the means for displaying;
   (e) means for determining and recording the time taken by the user to perform the tasks and assigning a point score for the task completion.

2. The portable device of claim 1, wherein said program further comprises means for displaying animation on said display indicative of each task at said predetermined time for that task to remind the user of the task.

3. The portable device of claim 1, wherein the point score assigned is determined by the predetermined interval in which the task is completed.

4. The portable device of claim 3, wherein said predetermined intervals are displayed on said display in the form of a pie-chart timer.

5. The portable device of claim 3, wherein said device further comprises a speaker, and wherein said program further comprises means for periodically alerting a user with a voice message relating to each task during the predetermined interval for that task.

6. The portable device of claim 5, wherein said means for periodically alerting a user comprise means for alerting a user once half of the predetermined interval for each task has expired.

7. The portable device of claim 1, wherein said program includes means for alerting the user upon expiration of the second predetermined interval for each task that said time period has expired, and means for prompting the user to request a further interval to complete the task if needed.

8. The portable device of claim 1, wherein said program includes means for generating a log of the time taken by the user to perform said tasks.

9. The portable device of claim 8, wherein said log is displayed on said display in the form of a bar graph.

10. The portable device of claim 1, wherein said program further comprises means for displaying a text message on said display indicative of each task at the predetermined time for that task to remind the user of the task.

11. The portable device of claim 1, further comprising a wireless modem for remote monitoring of task completion.

12. The portable device of claim 1, further comprising a pager card, and wherein said program includes means for enabling making remote alterations of said schedule.

13. The portable device of claim 1, further comprising means for establishing an infrared communications link with a personal computer to exchange information therewith.

14. The portable device of claim 1, further comprising a sending unit for transmitting a signal to a separate receiving unit, and means for sounding an alarm when said sending and receiving units are spaced-apart at a distance greater than a given distance.

15. The portable device of claim 1, further comprising means for enabling the user to record personal notes.

16. A computer program product in computer-readable media for assisting persons with learning disabilities or attention deficit disorders in performing given tasks, comprising:
   (a) means for enabling a user to create a schedule of tasks to be performed at predetermined times, and completed during predetermined intervals;
   (b) means for alerting a user at said predetermined times to perform respective tasks;
   (c) means for displaying the portion of the predetermined intervals remaining after the respective predetermined times to perform respective tasks has occurred;
   (d) means, responsive to the completion of the respective predetermined interval, for determining, with user input, if the task was completed prior to the completion of the respective predetermined interval, wherein, if the task was not completed in the respective predetermined interval, a second predetermined interval is assigned, initiated and the portion of the second predetermined interval is displayed using the means for displaying;
   (e) means for determining and recording the time taken by the user to perform the tasks and assigning a point score for the task completion.

17. The program product of claim 16, further comprising means for generating animation indicative of each task at the predetermined time for that task to remind the user of the task.

18. The program product of claim 16, wherein the point score assigned is determined by the predetermined interval in which the task is completed.

19. The program product of claim 16, wherein said predetermined intervals are displayed in the form of a pie-chart timer.

20. The program product of claim 18, further comprising means for periodically alerting a user with a voice message relating to each task during the recommended time period for that task.

21. The program product of claim 20, wherein said means for periodically alerting a user comprise means for alerting a user once half of the recommended time for each task has expired.

22. The program product of claim 16, further comprising means for alerting the user upon expiration of the second predetermined interval for each task that said time period has expired, and means for prompting the user to request a further interval to complete the task if needed.

23. The program product of claim 16, further comprising means for generating a log of the time taken by the user to perform said tasks.

24. The program product of claim 23, wherein said log is displayed in the form of a bar graph.

25. A method of assisting persons with learning disabilities or attention deficit disorders in performing given tasks, comprising:

enabling a user to create a schedule of tasks to be performed at predetermined times, and completed during predetermined intervals;

alerting a user at said predetermined times to perform respective tasks;

displaying the portion of the predetermined intervals remaining after the respective predetermined times to perform respective tasks has occurred;

responsive to the completion of the respective predetermined interval, determining, with user input, if the task was completed prior to the completion of the respective predetermined interval, wherein, if the task was not completed in the respective predetermined interval, a second predetermined interval is assigned, initiated and the portion of the second predetermined interval is displayed using the means for displaying;

determining and recording the time taken by the user to perform the tasks and assigning a point score for the task completion.

26. The method of claim 25, further comprising displaying animation indicative of each task at said predetermined time for that task to remind the user of the task.

27. The method of claim 25, wherein the point score assigned is determined by the predetermined period in which the task is completed.

28. The method of claim 27, wherein said predetermined periods are displayed in the form of a pie-chart timer.

29. The method of claim 27, further comprising periodically alerting a user with a voice message relating to each task during the predetermined interval period for that task.

30. The method of claim 29, wherein said step of periodically alerting a user comprises alerting a user once half of the predetermined interval for each task has expired.

31. The method of claim 27, further comprising alerting the user upon expiration of the predetermined interval for each task that said interval has expired, and prompting the user to request a further interval to complete the task if needed.

32. The method of claim 25, further comprising generating a log of the time taken by the user to perform said tasks.

\* \* \* \* \*